(12) United States Patent
Nahrwold et al.

(10) Patent No.: US 6,951,146 B1
(45) Date of Patent: Oct. 4, 2005

(54) METHOD AND APPARATUS FOR PRELOADING PINION BEARINGS

(75) Inventors: Thomas Lee Nahrwold, Ossian, IN (US); Robert William Sullivan, Fort Wayne, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/859,079

(22) Filed: Jun. 3, 2004

Related U.S. Application Data (62) Division of application No. 10/045,070, filed on Jan. 15, 2002, now Pat. No. 6,868,609.

(51) Int. Cl.$^7$ .............................................. G01L 5/12
(52) U.S. Cl. ................................................ 73/862.49
(58) Field of Search ...................... 73/862.49; 29/705, 29/437, 898.07, 898.09; 33/645

(56) References Cited

U.S. PATENT DOCUMENTS

| | | | |
|---|---|---|---|
| 2,145,841 A | 1/1939 | Walters | |
| 2,155,562 A | 4/1939 | Price | |
| 3,651,550 A | 3/1972 | Bennett | |
| 3,672,019 A | 6/1972 | Barnbrook et al. | |
| 3,785,023 A * | 1/1974 | Harbottle et al. | 29/148.4 |
| 4,054,999 A | 10/1977 | Harbottle | |
| 4,150,468 A | 4/1979 | Harbottle | |
| 4,336,641 A | 6/1982 | Bhatia | |
| 4,642,900 A | 2/1987 | Provost et al. | |
| 4,657,412 A * | 4/1987 | McLarty et al. | 384/447 |
| 4,744,153 A | 5/1988 | Brand | |
| 4,993,165 A | 2/1991 | French et al. | |
| 5,115,558 A | 5/1992 | Bernhardt et al. | |
| 5,261,750 A | 11/1993 | Eckhardt et al. | |
| 5,325,599 A | 7/1994 | Russell | |
| 5,386,630 A | 2/1995 | Fox | |
| 5,416,966 A | 5/1995 | Boerger et al. | |
| 5,497,559 A | 3/1996 | Okumura et al. | |
| 5,535,517 A | 7/1996 | Rode | |
| 5,557,854 A | 9/1996 | Fujioka | |
| 5,620,263 A | 4/1997 | Ohtsuki et al. | |

(Continued)

FOREIGN PATENT DOCUMENTS

JP   60018617 A   1/1985

(Continued)

*Primary Examiner*—Max Noori
*Assistant Examiner*—Octavia Davis
(74) *Attorney, Agent, or Firm*—Berenato, White & Stavish (57) ABSTRACT

A method for determining a thickness of a shim for setting up a predetermined preload of a bearing assembly that rotatably supports a shaft within a housing. The bearing assembly includes front and rear tapered roller bearings. The shim is disposed between a bearing supporting shoulder of the shaft and an inner cone of the rear bearing. The method comprises the steps of: measuring a distance X from an end face of the shaft to the bearing supporting shoulder thereof; measuring a height B of the inner cone; mounting the shaft within the housing; applying a load to the inner cone of the rear bearing corresponding to a predetermined preload; measuring a distance $X_L$ from the end face of the shaft to the inner cone of the rear bearing; and determining the thickness W of the shim in accordance with the following equation: $W = X - X_L - B$.

5 Claims, 7 Drawing Sheets

U.S. PATENT DOCUMENTS

| | | |
|---|---|---|
| 5,706,580 A | 1/1998 | Ohtsuki et al. |
| 5,718,049 A | 2/1998 | Ohtsuki et al. |
| 5,722,163 A | 3/1998 | Grant et al. |
| 5,743,016 A | 4/1998 | Manne et al. |
| 5,975,867 A | 11/1999 | Grant et al. |
| 6,070,325 A | 6/2000 | Miyata et al. |
| 6,202,306 B1 | 3/2001 | Miyazaki |
| 6,343,420 B1 * | 2/2002 | Beduhn et al. .......... 29/898.07 |
| 6,418,613 B1 | 7/2002 | Rode |
| 6,487,775 B2 | 12/2002 | Rode |
| 6,497,027 B1 | 12/2002 | Irwin |
| 6,502,307 B2 | 1/2003 | Komaba et al. |
| 6,588,119 B1 | 7/2003 | Russell et al. |
| 6,618,505 B2 | 9/2003 | Cork et al. |
| 6,618,924 B1 | 9/2003 | Irwin |
| 6,622,397 B1 | 9/2003 | Knoble |
| 6,868,609 B1 * | 3/2005 | Nahrwold et al. ....... 29/898.09 |

FOREIGN PATENT DOCUMENTS

| | | |
|---|---|---|
| JP | 63180767 A | 7/1988 |
| JP | 03163327 A | 7/1991 |
| JP | 06280765 A | 10/1994 |
| JP | 07229515 A | 8/1995 |
| JP | 09189543 A | 7/1997 |
| JP | 11182653 A | 7/1999 |

* cited by examiner

METHOD AND APPARATUS FOR PRELOADING PINION BEARINGS

This application is a Division Application of U.S. patent application Ser. No. 10/045,070 filed on Jan. 15, 2002 now U.S. Pat. No. 6,868,609. The disclosure of the prior application is hereby incorporated by reference herein in its entirety.

BACKGROUND OF THE INVENTION

1. Field of the Invention

This invention relates in general to setting antifriction bearings, and more particularly to a method and apparatus for pre-loading pinion tapered roller bearings.

2. Description of the Prior Art

Conventionally, a shaft that rotates within a housing requires bearings of some type to support it in the housing, and where the shaft must rotate with precision or carry significant radial and axial loads, the bearings are often single row tapered roller bearings. When mounted in pairs, these bearings must be adjusted against each other to control an end play or preload in the bearings, or in other words, to bring the bearing to the proper setting. Too much endplay detracts from the stability of the shaft. Preload, while keeping the shaft rotating about a fixed axis, if excessive, will produce too much friction within the bearings and cause them to experience early failure.

Within a pair of single row tapered roller bearings the setting depends on the axial spacing between the inner races or cones of the two bearings and the axial spacing between the outer races or cones of the two bearings. Various procedures and appliances exist for determining the proper spacing. Changing the spacing between the cones will alter the setting for the combination.

Tapered roller bearings find widespread use in automotive equipment—from small automobiles to large trucks. In the typical rear wheel drive vehicle, the longitudinal drive or propeller shaft is connected to a pinion shaft, which forms part of a vehicle's axle assembly. The pinion shaft typically rotates on two single row tapered roller bearings, which are located in a housing or differential carrier. The pinion shaft must rotate with considerable precision, lest the pinion carried by it will not mesh properly with a large ring gear in the differential assembly and thereby produce noise and excessive wear. To achieve this precision, the pinion shaft and the housing must not only be machined accurately, but the bearings must be set properly to a condition of slight preload where no radial or axial end play exists in the pinion shaft. The preload in the bearings imparts rigidity to the shaft, but too much preload will cause the bearings to overheat and fail prematurely. On the other hand, too little preload may cause the bearings to acquire end play, and this likewise decreases the life of the bearings and introduces radial and axial play into the shaft.

Several procedures exist for setting these bearings. One of the procedures for setting the pinion shaft bearings of automotive axles controls the setting of the bearings with a shim located between the inner cone of a rear bearing of the pinion shaft and a bearing support surface formed on the pinion shaft for axially supporting the inner cone of the rear bearing. Typically, the inner cone of the rear bearing is clamped between the pinion shaft and an end yoke, which is in turn secured by a nut, with the shim determining the distance between the two cones and hence the setting of the bearings.

However, a process of selecting a thickness of the shim remains a complex and laborious task, since it in essence relied on a trial and error procedure. With each new shim, the pinion shaft would be rotated to determine the amount of torque transmitted by the bearings, and when the torque fell within an acceptable range, one assumed that the assembly contained the shim of a proper thickness.

SUMMARY OF THE INVENTION

The present invention provides a novel method for determining a thickness of a shim member for setting up a predetermined preload of a bearing assembly that supports a pinion shaft within a housing and permit relative rotation therebetween an axis of rotation. The shaft has an end face at a rear end thereof and a bearing supporting shoulder. The bearing assembly includes a front tapered roller bearing and a rear tapered roller bearing, each of said bearings including an inner cone that fits around the shaft, an outer cone that is fitted into the housing and a plurality of rolling elements located therebetween. The shim member is disposed between the bearing supporting shoulder of the shaft and the inner cone of the rear bearing. The method comprises the steps of:
 a) measuring a distance X from the end face of the shaft to the bearing supporting-shoulder thereof;
 b) measuring a height B of the inner cone of the rear bearing;
 c) mounting the shaft within the housing through the bearing assembly;
 d) applying a predetermined load to the inner cone of the rear bearing corresponding to a proper preload of the bearing assembly;
 e) measuring a distance $X_L$ from the end face of the shaft to the inner cone of the rear bearing; and
 f) determining the thickness W of the shim member in accordance with the following equation:

$$W = X - X_L - B.$$

Preferably, the shaft is a pinion shaft of a vehicular differential assembly, and the housing is a differential carrier.

Therefore, the method and apparatus for determining the thickness of the shim member for setting up the predetermined preload of the bearing assembly in the shaft assembly in accordance with the present invention solves the need for a solution to the problem of controlling the bearing preload in the shaft assemblies, such as the pinion shaft assembly in the vehicular axle assemblies, in a simple, efficient and inexpensive manner.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
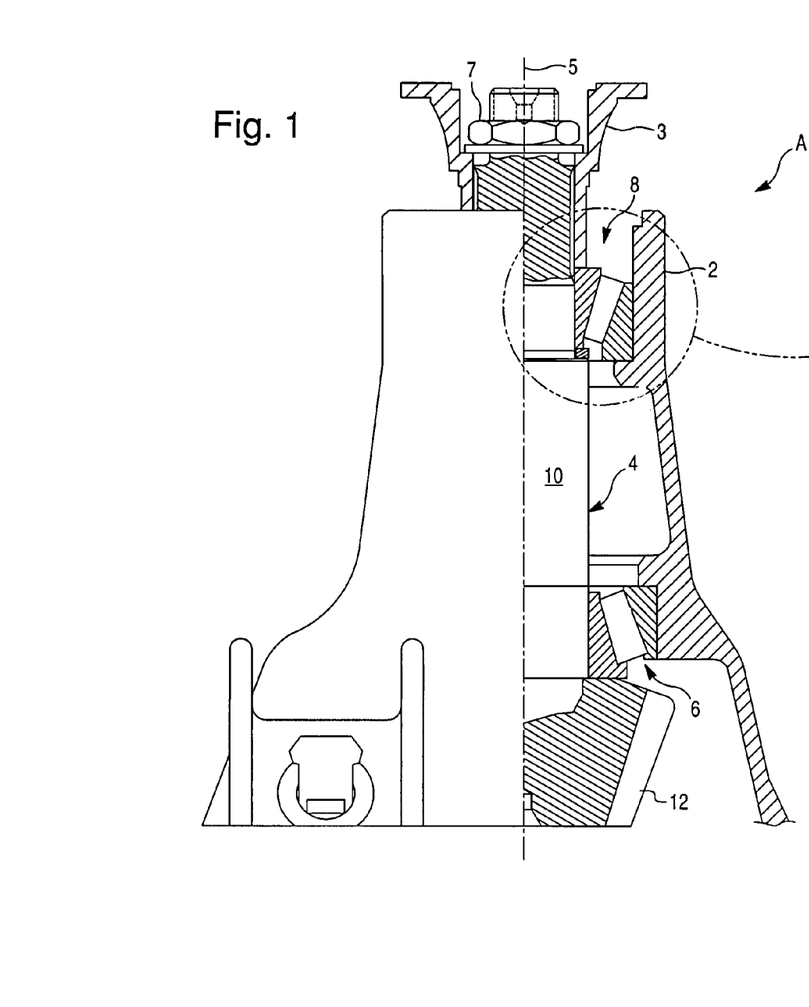
FIG. 1 is a partial sectional view of a pinion shaft assembly in accordance with the present invention.

Referring first to FIG. 1 of the drawing, a shaft assembly A comprises a bearing assembly supporting a shaft 4 for rotation about an axis 5 within a housing 2. The bearing assembly includes a front bearing 6 and a rear bearing 8. Here, in accordance with the preferred embodiment of the present invention, the shaft 4 is a pinion shaft of an automotive differential assembly (not shown), and the housing 2 is a differential carrier. As such, the carrier housing 2 is bolted to an axle housing (not shown).

Figure 3:
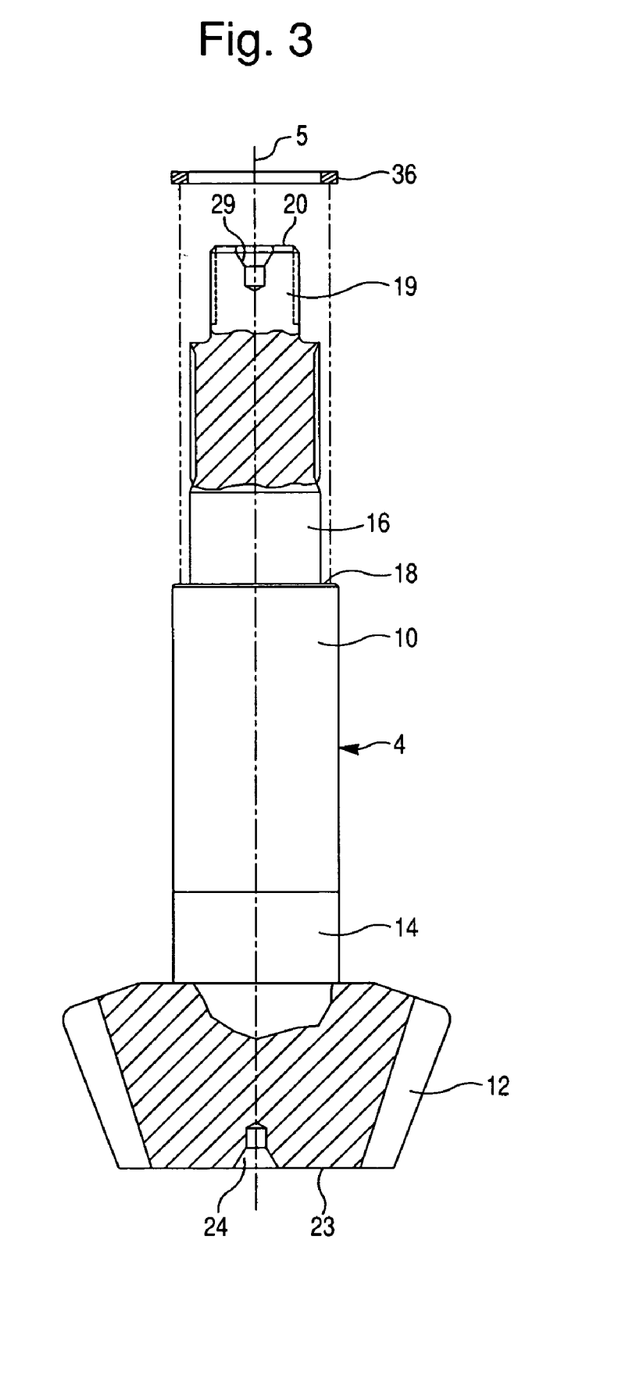
FIG. 3 is a partial sectional view of a pinion shaft in accordance with the present invention.

The pinion shaft 4, as illustrated in details in FIG. 3, includes a stem member 10 disposed within the differential carrier 2, and a pinion gear member 12 integrally provided at a front end thereof. The stem member 10 has a front bearing seat 14, a rear bearing seat 16, and a rear bearing support shoulder 18 disposed adjacent to the rear bearing seat 16. A distal end of the stem member 10 has a threaded end portion 19 and an end face 20 provided with a centering groove 22 coaxial with the axis 5. Respectively, an end face of the pinion gear member 12 is provided with a centering groove 24 coaxial with the axis 5.

Figure 2:
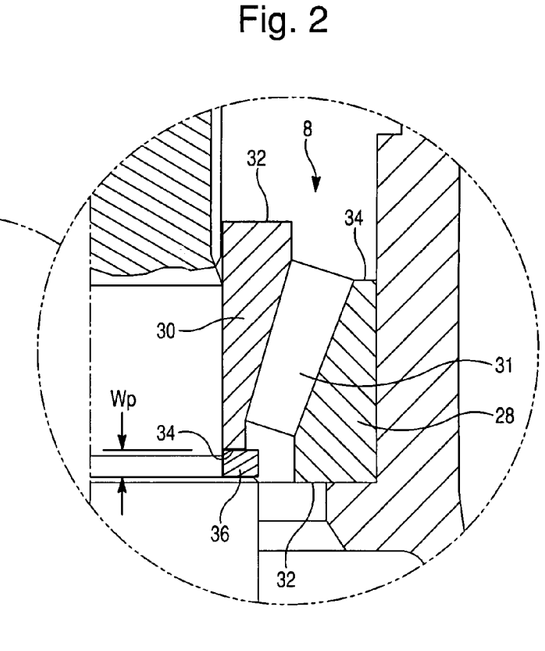
FIG. 2 is an enlarged view of a portion the pinion shaft assembly shown in a circle in FIG. 1.

As illustrated in FIGS. 1 and 2, the two bearings 6 and 8 are conventional tapered roller bearings capable of taking thrust loading as well as radial loading. Each of the bearings 6 and 8 includes an outer cone 28 having an inwardly presented raceway, which is tapered with respect to the axis 5 and an inner cone 30 having an outwardly presented raceway, which is likewise tapered with respect to the axis 5. A plurality of tapered rollers 31 are arranged in a single row between the inner cone 30 and the outer cone 28.

Each bearing 6 and 8, being a tapered roller bearing, will take both radial and axial loads. The axial or thrust loads are transmitted to the bearings 6 and 8 at large end faces of their cones 28 and 30, these faces being commonly referred to as back faces 32. Opposite end faces of the cones 28 and 30 are known as front faces 34.

When assembled, the shaft assembly A further includes a preload adjusting shim member (or shim members) 36 sandwiched between the rear bearing support shoulder 18 and the front face 34 of the inner cone 30 of the rear bearing 8. The shim member 36 limits forward displacement of the inner cone 30 of the rear bearing 8, thus providing a predetermined preload of the bearings 6 and 8.

The back face 32 of the inner cone 30 for the bearing 8, on the other hand, abuts an end yoke 3 that drivingly engages the stem 10 of the pinion shaft 4, preferably through a spline connection. The end yoke 3 in turn is held on the shaft 4 with a nut 7, which engages threads of the threaded end portion 19. Indeed, when the nut 7 is turned down over the threaded end portion 19, it forces the end yoke 3 further along the stem 10 of the shaft 4, and the end yoke 3, in turn, forces the inner cone 30 of the rear bearing 8 along the rear bearing seat 16 of the pinion shaft 4. After some distance, the inner cone 30 encounters the shim member 36, which now becomes firmly clamped between the front face 34 of the inner cone 30 and the bearing support shoulder 18 of the pinion shaft 4, thus preloading the bearings 6 and 8.

In order to provide the proper predetermined preload of the bearings 6 and 8, it is necessary to have the front face 34 of the inner cone 30 of the rear bearing 8 spaced a predetermined distance $W_P$ from the rear bearing support shoulder 18 of the stem member 10 of the pinion shaft 4. This distance $W_P$ (shown in FIG. 2) determines a required proper thickness of the shim member 36 that provides the predetermined preload of the bearing assembly of the shaft assembly A. The distance between the front face 34 of the inner cone 30 and the rear bearing support shoulder 18 of the stem member 10 is varied by varying the thickness of the shim member 36.

Figure 4:
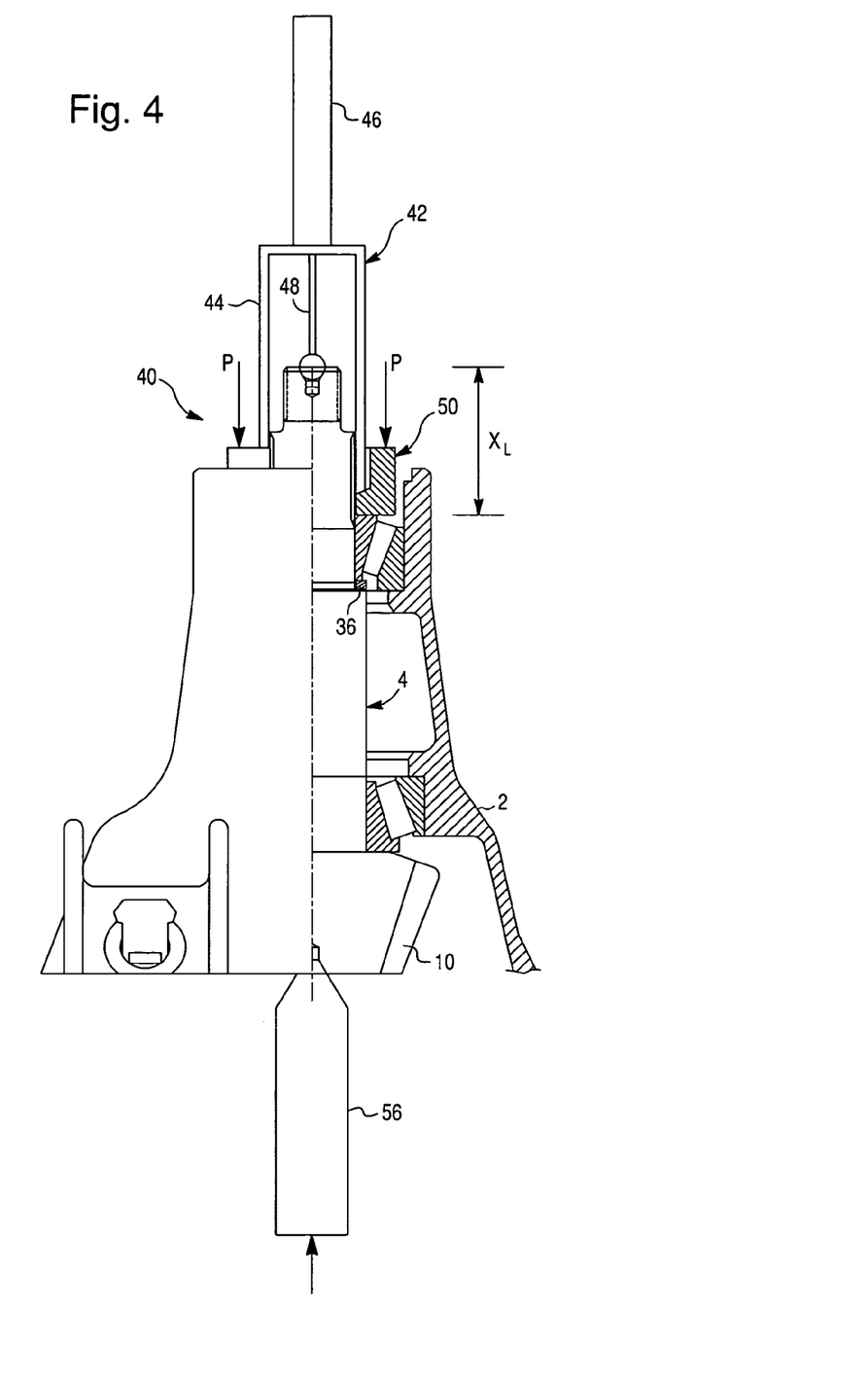
FIG. 4 is a partial sectional view of a pinion shaft assembly with an apparatus for determining a required thickness of a shim member installed thereon in accordance with the present invention.

Illustrated in FIG. 4 is an apparatus 40 for determining the required thickness of the shim member 36. The apparatus 40 comprises a measuring device 42, a bearing preloading fixture 50 for preloading the bearing assembly by applying an axial load to the inner cone 30 of the rear bearing 8, and a centering fixture 56 for centering the axle shaft 4 and supporting it in the axial direction while the axial load is applied thereto through the bearing preloading fixture 50.

Figure 5:
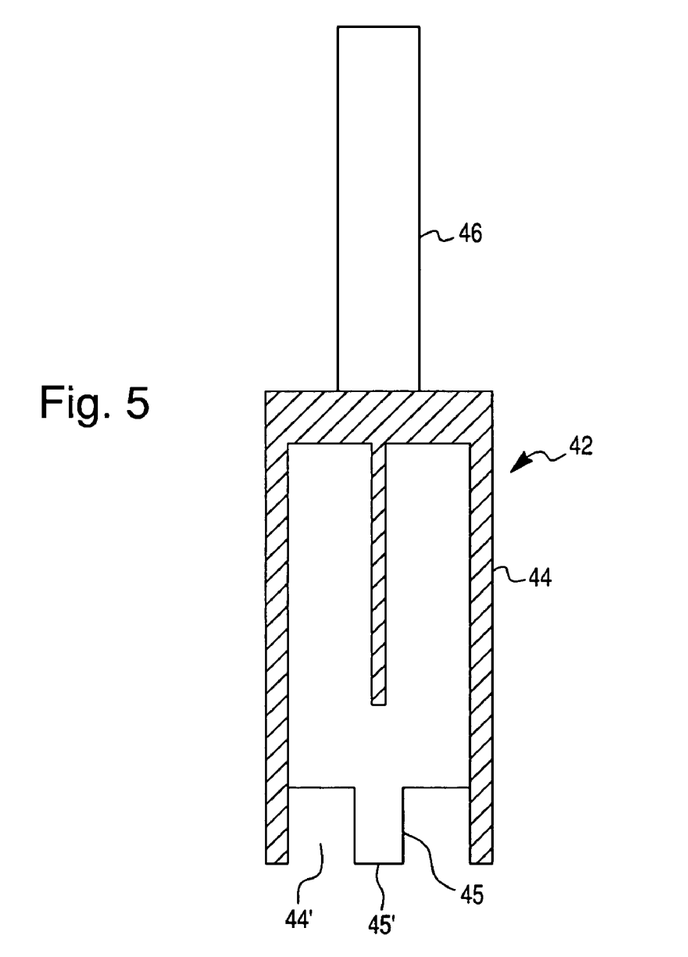
FIG. 5 is a partial sectional view of a measuring device in accordance with the present invention.
Figure 6:
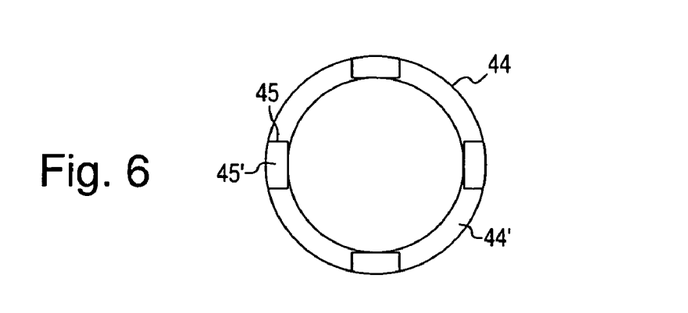
FIG. 6 is a bottom view of the measuring device in accordance with the present invention.
Figure 10:
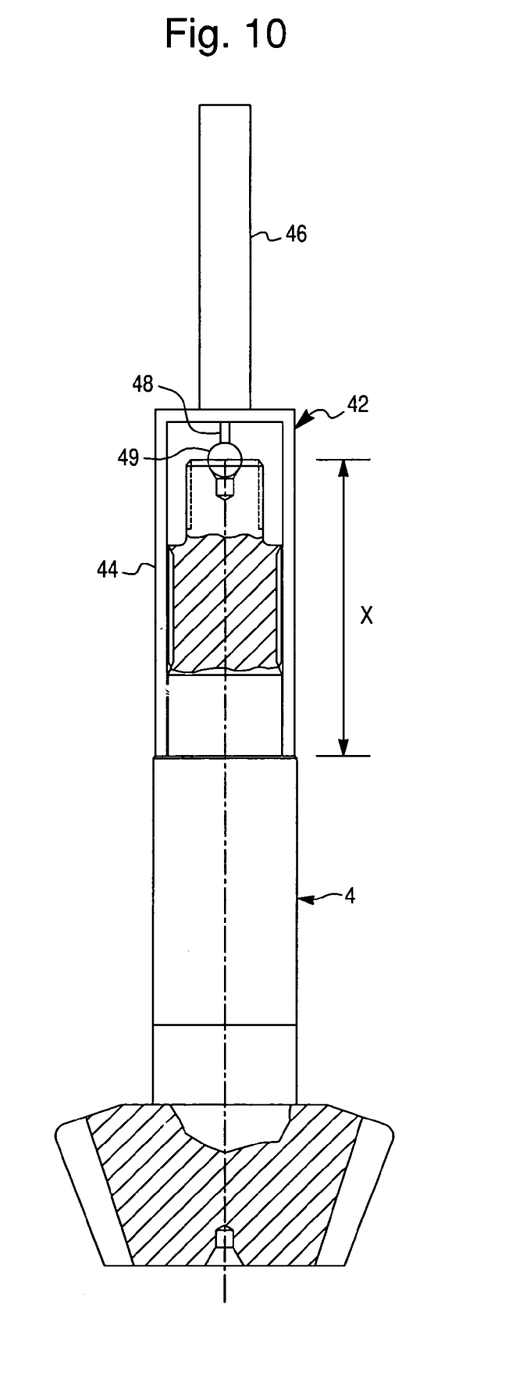
FIG. 10 is a partial sectional view of the measuring device installed on the pinion shaft for measurement.

As illustrated in details in FIGS. 5 and 6, the measuring device 42 comprises a substantially cylindrical body 44 and a distance measuring indicator device 46 connected to a measuring probe 48 (further illustrated in FIGS. 4 and 10). The cylindrical body 44 has an open end 44' provided with a plurality (preferably four) of circumferentially spaced contact legs 45, each provided with a contact surface 45' at the distal end thereof. The contact surfaces 45' of the measuring device 42 are adapted to contact the back face 32 of the inner cone 30 of the rear bearing 8. Preferably, the indicator device 46 is in the form of a linear variable differential transformer (LVDT), although other appropriate indicator devices, such as laser measurement device, well known to those skilled in the art are within the scope of the present invention.

Figure 7:
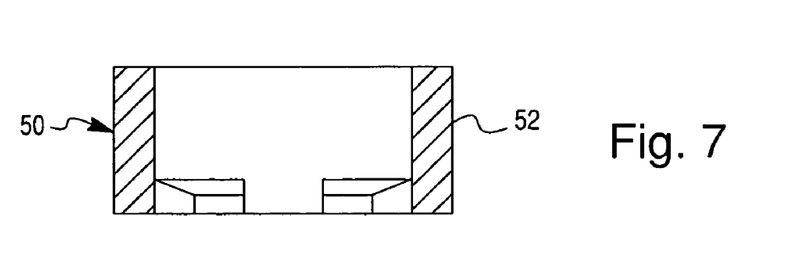
FIG. 7 is a sectional view of a bearing preloading fixture in accordance with the present invention.
Figure 8:
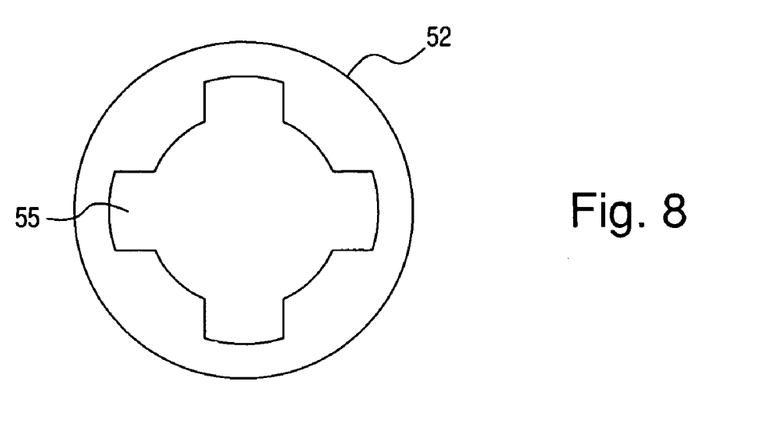
FIG. 8 is a bottom view of the bearing preloading fixture in accordance with the present invention.
Figure 9:
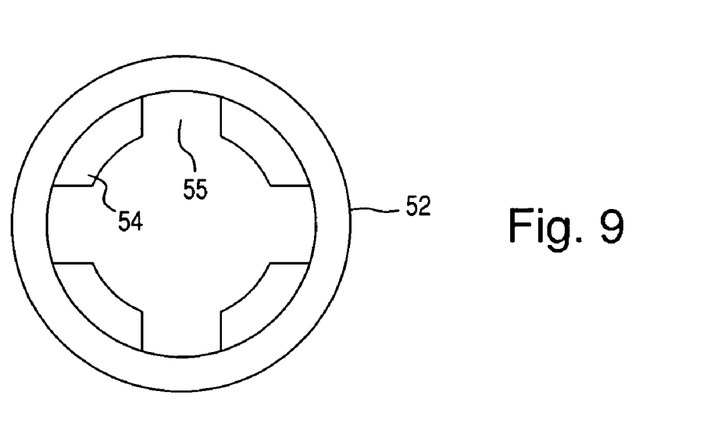
FIG. 9 is a top view of the bearing preloading fixture in accordance with the present invention.

The bearing preloading fixture 50, illustrated in details in FIGS. 7–9, includes a substantially cylindrical body member 52 and a plurality of radially inwardly extending loading arms 54 defining a plurality of slots 55 therebetween. The loading arms 54 are adapted to apply the axial load to the inner cone 30 of the rear bearing 8. Spacing between the slots 55 is complimentary to the spacing between the contact legs 45 of the measuring device 42, so that, when the apparatus 40 is assembled, the contact legs 45 extend between the arms 54 of the fixture 50 through the slots 55 and engage the back face 32 of the inner cone 30 of the bearing 8.

Figure 11:
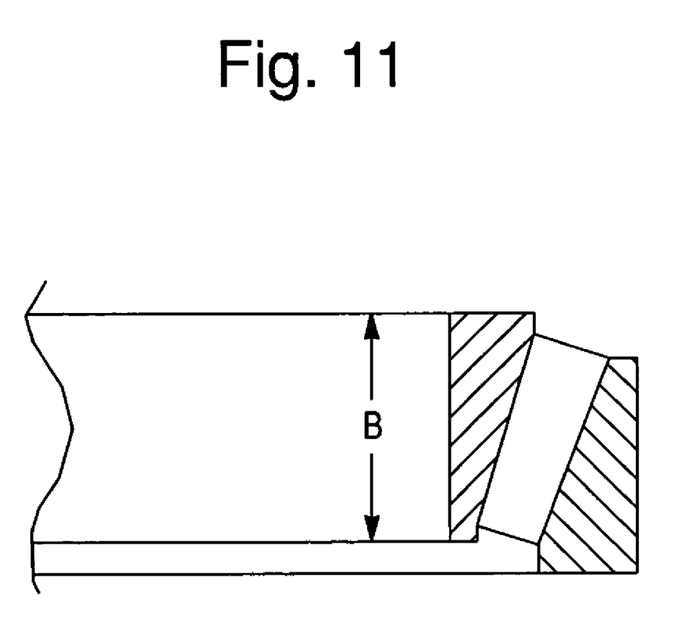
FIG. 11 is a sectional view of a rear tapered roller bearing.

In accordance with the present invention, a method for determining the proper thickness $W_P$ of the shim member 36 for setting up the predetermined preload of the bearing assembly of the shaft assembly A is provided. The method is preformed in the following manner:

first, a value of a distance X from the end face 20 of the pinion shaft 4 to the bearing supporting shoulder 18 thereof is determined using the measuring device 42, as shown in FIG. 10. As illustrated, the contact surface 45' of the legs 45 of the measuring device 42 engages the back face 32 of the inner cone 30 of the bearing 8, and a contact ball 49 of the measuring probe 48 engages the centering groove 22 provided at the end face 20 of the pinion shaft 4;

second, the height B of the inner cone 30 of the rear bearing 8 is measured, as illustrated in FIG. 11;

third, the front and rear bearings 6 and 8 are installed into their intended positions on the stem 10 of the pinion shaft 4. However, the end yoke 3 is not mounted to the stem 10 of the pinion shaft 4, as illustrated in FIG. 4. Then, the bearing preloading fixture 50 is mounted about the stem 10 of the pinion shaft 4 until abutting the back face 32 of the inner cone 30 of the rear bearing 8. Also, the centering fixture 56 is provided for engaging the centering groove 24 on a front face 23 of the pinion shaft 4 and coaxial with the axis 5;

forth, the predetermined load corresponding to a proper preload P (optimal for the particular bearing assembly being used) is applied to the back face 32 of the inner cone 30 of the rear bearing 8 through the bearing preloading fixture 50 and the centering fixture by an appropriate axial press device (not shown), and the pinion shaft is rotated relative to the housing 2 to make sure that the bearings are properly seated. Preferably, minimum 8 rotations are required;

fifth, the measuring device 42 is installed about the stem 10 of the pinion shaft 4 so that the legs 45, pass throug the slots 55 between the arms 54 of the bearing preloading fixture 50, and a distance $X_L$ from the end face 20 of said shaft 4 to the back face 32 of the inner cone 30 of the rear bearing 8 is measured using the measuring device 42, as shown in FIG. 4; and sixth, the proper thickness $W_P$ of the shim member 36 that would provide the predetermined preload of the bearing assembly of the shaft assembly A is determined in accordance with the following equation:

$$W_P = X - X_L - B.$$

Therefore, the method and apparatus for determining the thickness of the shim member for setting up the predetermined preload of the bearing assembly in the shaft assembly in accordance with the present invention solves the need for a solution to the problem of controlling the bearing preload in the shaft assemblies, such as the pinion shaft assembly in the vehicular axle assemblies, in a simple, efficient and inexpensive manner.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An apparatus for determining a thickness of a shim member for setting up preloading of a bearing assembly that supports a shaft within a housing and permits relative rotation between said shaft and said housing about an axis, said shaft having an end face at a rear end thereof and a bearing supporting shoulder, said bearing assembly including a front tapered roller bearing and a rear tapered roller bearing, each of said bearings having the capacity to transmit radial and axial loads and including an inner cone that fits around said shaft, an outer cone that is fitted into said housing and a plurality of rolling elements located therebetween, said shim member disposed between said bearing supporting shoulder of said shaft and said inner cone of said front bearing, said apparatus comprising:

a measuring device for gauging the location of said bearing supporting shoulder and said inner cone of said rear bearing in the preloaded condition;

a bearing preload fixture for applying a predetermined axial load to said inner cone of said rear bearing corresponding to a proper preload of said differential assembly; and a centering fixture for centering said shaft and supporting it in the axial direction while said axial load is applied thereto through said bearing preloading fixture, wherein said measuring device includes a first portion integrally formed with a second portion, said first portion adapted for engaging said bearing supporting shoulder or said inner cone of said rear bearing, and said second portion connected to a measuring probe adapted for engaging said end face of said shaft.

2. The apparatus as defined in claim 1, wherein said measuring device measures a distance from said end face of said shaft to said bearing supporting shoulder thereof and a distance from said end face of said shaft to said inner cone of said rear bearing in the preloaded condition.

3. The apparatus as defined in claim 2, wherein said first portion is a substantially cylindrical body having a plurality of circumferentially spaced contact legs adapted for engaging said bearing supporting shoulder or said inner cone of said rear bearing, and said second portion is a distance measuring indicator device connected to said measuring probe adapted for engaging said end face of said shaft.

4. The apparatus as defined in claim 3, wherein said contact legs of said measuring device pass through complementary slots in said bearing preload fixture.

5. An apparatus for determining a thickness of a shim member for setting up preloading of a bearing assembly that supports a pinion shaft within a differential carrier and permits relative rotation between said pinion shaft and said housing about an axis, said pinion shaft having an end face at a rear end thereof and a bearing supporting shoulder, said bearing assembly including a front tapered roller bearing and a rear tapered roller bearing, each of said bearings having the capacity to transmit radial and axial loads and including an inner cone that fits around said pinion shaft, an outer cone that is fitted into said housing and a plurality of rolling elements located therebetween, said shim member disposed between said bearing supporting shoulder of said pinion shaft and said inner cone of said front bearing, said apparatus comprising:

a measuring device for measuring a distance from said end face of said shaft to said bearing supporting shoulder thereof and a distance from said end face of said shaft to said inner cone of said rear bearing in the preloaded condition;

said measuring device including a substantially cylindrical body having a plurality of circumferentially spaced contact legs adapted for engaging said bearing supporting shoulder or said inner cone of said rear bearing, and a distance measuring indicator device connected to a measuring probe adapted for engaging said end face of said pinion shaft;

a bearing preload fixture for applying a predetermined axial load to said inner cone of said rear bearing corresponding to a proper preload of said differential assembly; and a centering fixture for centering said pinion shaft and supporting it in the axial direction while said axial load is applied thereto through said bearing preloading fixture;

wherein said contact legs of said measuring device pass through complementary slots in said bearing preload fixture.

* * * * *